United States Patent [19]

Heckman

[11] Patent Number: 5,078,577
[45] Date of Patent: Jan. 7, 1992

[54] AUTOMATIC BILGE PUMPING AND ALARM UNIT

[76] Inventor: James R. Heckman, 1165 Eldridge St., Clearwater, Fla. 34615

[21] Appl. No.: 468,832

[22] Filed: Jan. 18, 1990

[51] Int. Cl.⁵ .............................................. F04B 49/02
[52] U.S. Cl. ........................................ 417/2; 417/12; 417/36; 417/44; 417/63
[58] Field of Search ................ 417/2, 12, 36, 3, 4, 417/5, 44, 63

[56] References Cited

U.S. PATENT DOCUMENTS

| | | | |
|---|---|---|---|
| 3,941,507 | 3/1976 | Niedermeyer | 417/2 |
| 4,171,932 | 10/1979 | Miller | 417/36 |
| 4,341,178 | 7/1982 | Price | 417/63 |
| 4,380,091 | 3/1983 | Lively | 137/386 |
| 4,444,545 | 4/1984 | Sanders et al. | 417/40 |
| 4,551,068 | 11/1985 | Boudreaux | 417/63 |
| 4,652,802 | 3/1987 | Johnston | 417/40 |
| 4,881,873 | 11/1989 | Smith et al. | 417/36 |

OTHER PUBLICATIONS

Humphries, James T. et al., *Industrial Electronics*, 3rd Edition, pp. 407-408 & 427.

*Primary Examiner*—Richard A. Bertsch
*Assistant Examiner*—David W. Scheuermann
*Attorney, Agent, or Firm*—Bailey & Hardaway

[57] ABSTRACT

A system for the automatic operation of a marine bilge pump is provided. The system comprises, in series, a fluid level detector, a fluid level discrimination circuit, and pump control circuitry. The fluid level detector uses an AC signal to determine when an unacceptable level of bilge water is present. The discrimination circuit determines when the fluid level detector is sensing a true level reading, as opposed to mere bilge water sloshing. If the water level is indeed too high, a bilge pump is activated. The system may be adapted for multiple pump operation. Furthermore, an emergency backup circuit, as well as alarms and a test circuit, may be added.

12 Claims, 5 Drawing Sheets

AUTOMATIC BILGE PUMPING AND ALARM UNIT

BACKGROUND OF THE INVENTION

The invention relates to bilge pumps, particularly multi-pump systems with automatic activation means.

The hulls of recreational and commercial water vessels typically have one or more critical low areas. Such areas are prone to collect water which may either be leaked into the vessel through the hull or dripped down to the bottom of the vessel from the deck areas. Clearly any excess accumulation of such water poses a significant threat to the seaworthiness of the vessel and exposes the occupants to the perils of the sea. The present invention teaches an apparatus useful in controlling and minimizing this peril.

A number of inventions teach the control of liquid or fluid levels within a tank, pump, bilge of a vessel, or other areas in which fluid levels may be significant. Most such devices incorporate a fluid detection means, a pump control means, and one or more pumps. Some of the more recent technology is taught in the patents which are listed below:

3,772,531 Webb et al. Nov. 13, 1973
3,916,213 Lutheran Oct. 28, 1975
3,922,564 Kachuk et al. Nov. 25, 1975
4,205,237 Miller May 27, 1980
4,222,711 Mayer Sep. 16, 1980
4,551,068 Boudreaux Nov. 5, 1985
4,600,844 Atkins Jul. 15, 1986
4,678,403 Rudy et al. Jul. 7, 1987

Some of these patents teach systems of keeping the fluid between given desired levels. One example of such a system is U.S. Pat. No. 4,600,844 issued to Atkins on July 15, 1986. Atkins has a detector at the lowest desired level and a detector at the highest desired level. Circuitry is provided to keep the fluid level within these extremes by switching pumps on when the upper level is exceeded and turning off when the lower level is achieved.

Another such patent, U.S. Pat. No. 4,205,237, issued to Miller on May 27, 1988, teaches a means of allowing for instantaneous changes in the water level as a result of wave or ripple motion. It comprises a time delay means to ensure that the water level detected by the fluid detection means is a true one and not simply the result of an aberrant peak or trough of a wave.

Other systems have been devised to teach methods and apparatus for ready ascertainment of the status of bilge pumps and fluid levels within bilge areas. One such patent is U.S. Pat. No. 4,705,456 issued to Gardeen on Nov. 10, 1987. It teaches a control panel which will readily tell the observer which bilge pumps are on and whether the bilge pumps are on as a result of moderately high or very high water within the given bilge area. Gardeen also provides a test circuit in order to ensure that the control lights are working. Similarly, the U.S. Pat. No. 4,456,432 issued to Mannino on June 26, 1984, teaches an emergency pumping and alarm warning system. It teaches an auxiliary pump along with a system for providing visual and audio warnings when the back up emergency system is activated.

With respect to the bilge areas of a water vessel there are a number of common shortcomings in the presently available automated pumping systems. These include the electroplating of fluid detection probes as a result of the use of direct current (DC) fluid detectors, the lack of a comprehensive alarm and backup system which will both activate the pumps and warn the boater, the requirements for the boater to physically check the bilge pumps, and the lack of isolation between the detection/activation circuits and the pump circuits.

What is needed and not provided by these prior art patents is a single integrated system which will perform each of the following functions:

1. automatic control of bilge pumping within critical bilge areas;
2. emergency back up switching means;
3. control panel lights to communicate to the observer which bilge areas require and are receiving bilge pumping;
4. emergency alarm indicators, including remotely located ones, to protect the integrity of the system;
5. isolation of control systems from pump power sources; and
6. test circuity to ensure that all systems, including the alarm and back up systems, are functioning properly.

SUMMARY OF THE INVENTION

The invention is generally described as a pumping control system, which may comprise only one or may have a number of separate pumps, which is in operable communication with fluid level detectors and is in further operable communication with an alarm system and alarm test circuit.

The system comprises a fluid level detector using an AC signal to very reliably detect the presence of an excess of fluid in appropriately selected areas of the hull. The fluid level detector is in communication with electronic circuitry which is capable of determining when an unacceptable level of water requires automatic activation of a given bilge pump. Upon making such a determination, a bilge pump will be engaged until the water level within the given area has been reduced to an acceptable level.

In multi-pump systems, the apparatus is additionally adapted with a tackup fluid level detector, which operates as a safeguard against any failure in the described first level fluid level detector and pump activation systems. In order to further safeguard the integrity of the system, an alarm test circuit is provided. Such a test circuit can be activated with a push button in order to ensure that an appropriate signal from the backup fluid level detector will activate the bilge pumps.

It is thus an object of the invention to provide a bilge pumping system with automatic activation means.

It is thus a further object of the invention to provide an electric bilge pumping system which can easily be checked for electronic integrity.

It is a further object of the invention to provide an electronic bilge pumping network with emergency activation capabilities.

It is a further object of the invention to provide an automatically activated electronic bilge pumping assembly with an alarm system to alert the boater at various convenient points within the boat of the need for attention to the bilge pumping system.

Other features and advantages of the present invention will be apparent from the following description in which the preferred embodiments have been set forth in conjunction with the accompanying drawings.

Exhibit I is a schematic diagram of an LM1830 fluid detection system with the connections for the presently described system.

DETAILED DESCRIPTION OF THE PREFERRED EMBODIMENTS

Figure 1:
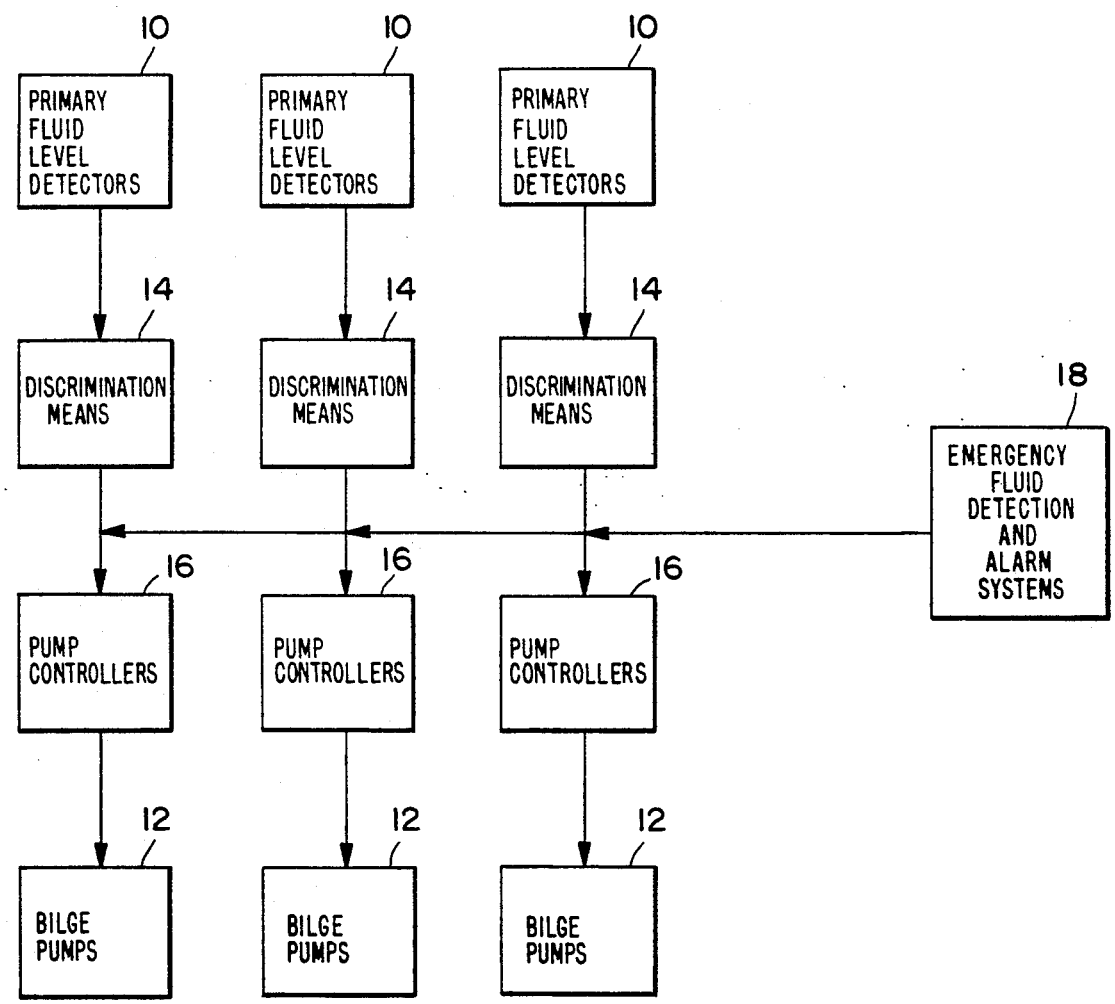
FIG. 1 depicts a block diagram of the system indicating its major components.

In order to fully describe the preferred embodiment of the present invention, reference will first be made to FIG. 1. It is best to start by presenting a block diagram of the preferred embodiment and describe the functions to be performed by each major component of the overall system. Then each component can be developed in more detail in order to show how the components work together to accomplish the desired objectives. It should first be noted that there are primary fluid level detectors 10 provided in the same number as the number of bilge pumps 12. This is because each such primary fluid level detector 10 has a fluid level probe as a component thereof placed in proximity to one of the likely potential bilge areas within the hull of a vessel. Each such fluid level detector 10 contains an alternating current signal source to assist it in its detection of fluid. When the presence of fluid is detected, detectors 10 generate a signal which is received by discrimination means 14.

The discrimination means 14 is adapted to stabilize fluctuations in fluid level readings passed along from fluid detector 10 which will, from the bilge area of a boat hull, fluctuate due to wave or rippling motion within a given bilge area. This is generally done by integrating the fluid level signals. The discrimination means 14 further comprises a trigger circuit. The trigger circuit is adapted to pass along an activation signal to the pump controllers 16 when a sufficiently high level of fluid is detected in a given bilge area. Pump controllers 16 then turn individual bilge pumps 12 on. The discrimination means 14 will also instruct pump controllers 16 to turn bilge pumps 12 off when a sufficiently low level of fluid is achieved. This will prevent the system from continuously turning itself off and on during the event of a slow leak, rainfall or other cause of a steady stream of undesired fluid within the bilge area when the fluid level is very near the critical switch on level.

Emergency fluid detection and alarm systems 18 are provided for activation of pump controllers 16 and separate alarm systems should the primary detectors 10 fail. The emergency fluid detection and alarm systems 18 are also equipped with a test circuit to ensure the integrity of the alarm system.

The preferred embodiment of the present invention also incorporates certain unique alarm and signaling devices, which primarily comprise panel lights but also include remote light and audio alarms. By incorporating the pump control circuitry with the alarm circuitry it will be shown that a more effective and reliable method of controlling bilge water in boats has been accomplished.

Figure 2:
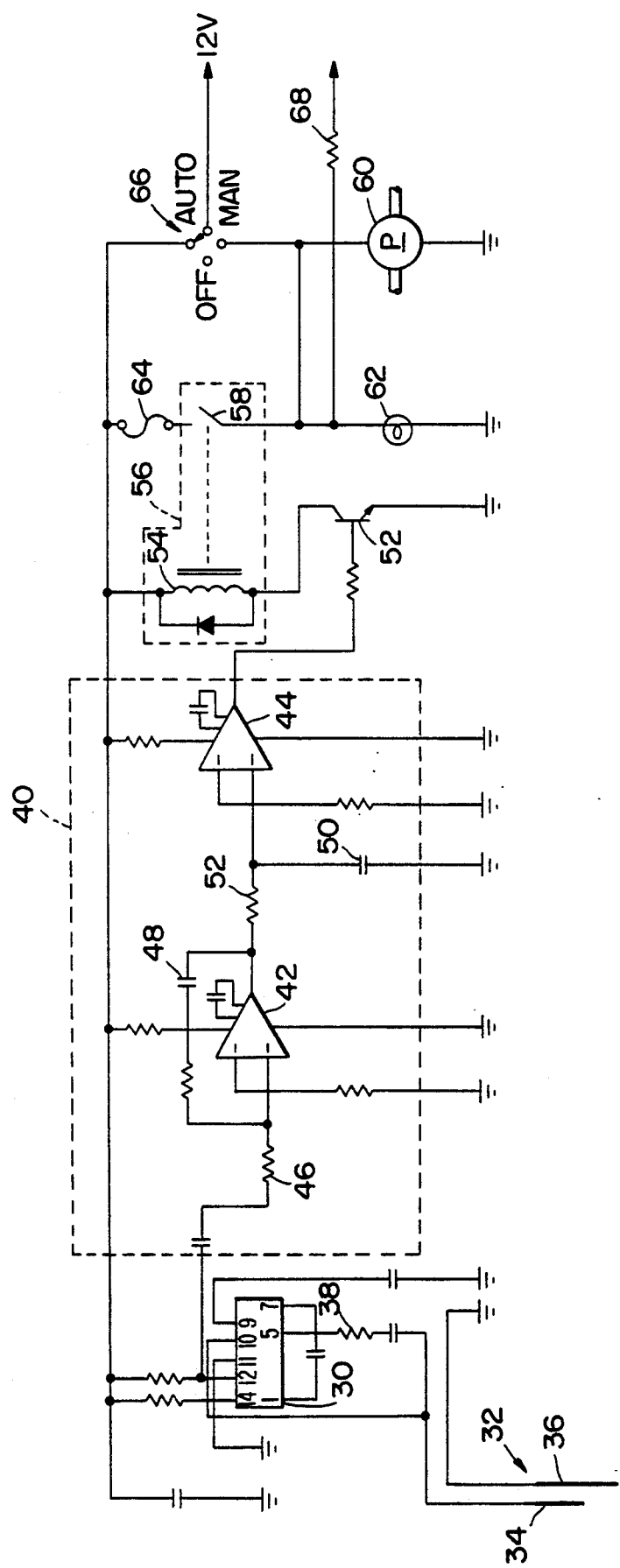
FIG. 2 depicts the circuitry of a single pump system without the optional emergency backup systems.

It is helpful to understanding the invention to first examine a single pump system, as depicted schematically in FIG. 2. An integrated circuit, such as chip 30, and fluid level probe 32 comprise the fluid level detector (shown as 10 of FIG. 1). A National Semiconductor LM1830 has been chosen for chip 30. Exhibit I is a schematic diagram of an LM1830 showing in detail substantially the same wiring pattern as used here. Probe 32 has conducting surfaces 34 and 36. Surfaces 34 and 36 are very close to, but separated from, one another. Surface 34 is in electrical communication with a source of alternating electrical potential from chip 30. Surface 36 is grounded. The advantage of using an alternating current (AC) signal for fluid detection is that surfaces 34 and 36 will not electroplate The invention therefore requires less maintenance than older systems. The probe 32 is adapted to be suspended within the critical areas of the lower portion of the hull of the vessel in close proximity to the vessel's bilge pump intake ports. Surface 36 is adapted to hang slightly lower than surface 34.

While suspended in ambient air, the resistance between the surfaces 34 and 36 is essentially infinite. However, when a fluid is introduced into probe 32, the resistance between surfaces 34 and 36 drops, causing a current to flow between them. This resistance will be below that of the chosen resistance value of resistor 38. When chip 30 detects that the probe resistance has fallen below the value of resistor 38, an output voltage is produced. This output voltage is passed to discrimination means (shown as 14 of FIG. 1) of the invention.

The discrimination means is an operational amplifier (op-amp) network 40. The primary advantage of using an op-amp network, such as 40, in this application is that wave motion averaging can be achieved, thus giving environmental control over pump on-off parameters. Wave motion averaging compensates for the inevitable fluid sloshing, thereby obtaining a true fluid level reading. That is to say, the pump will be activated only when the probe 32 is in the fluid more time than it is not. If a pump has been so activated and the probe 32 no longer is exposed to fluid a greater time than it is not, bilging operation will nevertheless continue for a short time and then stop. This continuation of bilging operation is necessary to prevent the system from frequently and repeatedly activating and deactivating itself as soon as a threshold fluid level is passed in either direction.

To realize this advantage, network 40 comprises an integrator amp 42 and a trigger amp 44. Integrator amp 42 receives the output from chip 30 and integrates it slowly. The degree of slow integration is controlled by the values of resistor 46 and capacitor 48, as one skilled in the art will recognize. The slowly rising output from amp 42 charges capacitor 50. The rate of charging of capacitor 50 is controlled by its value and the value of resistor 52. As one skilled in the art will recognize, capacitor 50 and resistor 52 form a passive low-pass RC filter section. Since trigger amp 44 is arranged in an open-loop configuration, its output will slew to the power supply level when the voltage across capacitor 50 exceeds the off-set value. The output cf trigger amp 44 is then fed to the base of transistor 52, causing current to flow through coil 54 of relay 56. As a result, relay switch 58 closes and pump 60 (shown as 12 of FIG. 1) is activated, along with lamp 62. Relay 56 and transistor 52 comprise the controller 18 of FIG. 1. It is appropriate to note here that the use of relay 56 to throw relay switch 58 permits pump 60 and its related circuitry to be electrically isolated from the remainder of the system.

When fluid is not present between surfaces 34 and 36, the output of chip 30 drops to zero. This causes the output of amp 42 to slowly fall. As the output of amp 42 falls, capacitor 50 begins to discharge. At such time as the voltage across capacitor 50 no longer exceeds the off-set value, pump 60 and light 62 will deactivate. Circuit breaker 64 (shown as a fuse) protects the pump from power surges or short circuits. Typically breaker 64 will be of the well-known type having a built-in indicator light alerting the user that the circuit is broken. Switch 66 allows the user to choose between three modes of operation: (1) off; (2) automatic bilging; or (3) manual pumping. Light 62, in addition to being brightly lit when pump 60 is activated, is dimly lit when the boat's running lights are on. This is because light 62 is adapted to be in electrical communication with the running lights through voltage-dividing resistor 68.

Figure 3:
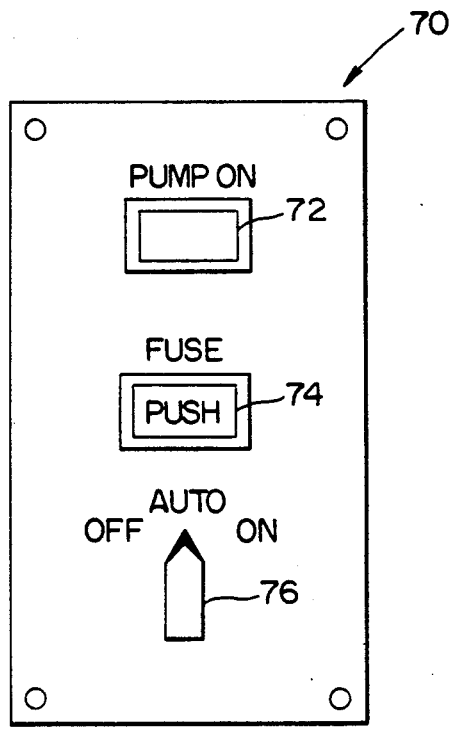
FIG. 3 depicts the control panel of a single pump system.

The control panel 70 of such a system is shown in FIG. 3. The panel light 72 (shown as 62 in FIG. 2) indicates pump operation. A circuit breaker reset button/indicator light is provided at 74. Switch 76 is the one depicted schematically in FIG. 2 as 66.

Figure 4:
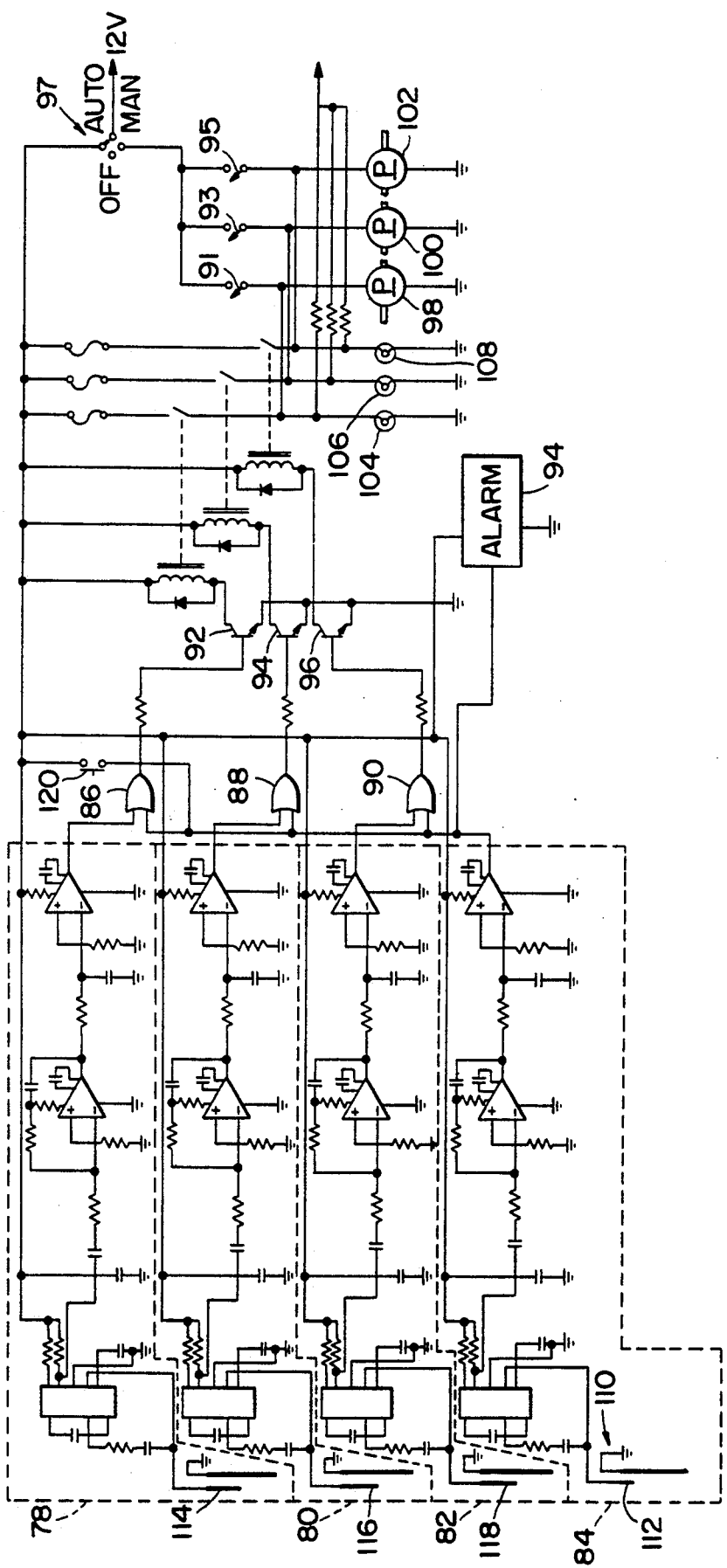
FIG. 4 depicts a schematic diagram of the circuitry involved in a multi-pump system including all alarms, backups, and test systems.

Having described the essentials of a single-pump system, it now can be more easily described how a multi-pump system can be designed with appropriate backups and alarms. Reference will be made to FIG. 4. A three pump system will be depicted and described, but the system could be, with the principles described and used, adapted to operate with any desired number of pumps. The three primary systems 78, 80, 82 are identical to the fluid detection and op-amp systems described above. Additionally, an emergency fluid level detection and discrimination system 84 has been added.

A high output from one of the primary systems 78, 80 or 82 is fed to the corresponding OR gate 86, 88, 90, causing its output to go high. The OR gate output is then fed to the base of the corresponding transistor 92, 94, 96 which causes the appropriate pump 98, 100, 102 and light 104, 106, 108 to be activated as described for a single pump system.

The upper surface 112 within the probe 110 of emergency system 84 is adapted to be located at a level higher than that of any of the upper surfaces 114, 116, 118 of the primary systems 78, 80, 82. If surface 112 begins to experience the presence of fluid more often than not, an emergency condition exists. The average fluid level will never be this high under normal operating conditions. The high output of emergency system 84 is fed to all three OR gates 86, 88 and 90, causing all pumps to operate simultaneously. Additionally, an alarm buzzer and light (shown as box 94) is activated. In this way, the overall system responds to the emergency situation and alerts the user that the situation exists.

In order to provide the boater a means of checking the integrity of the system, a test switch, such as push button 120, is provided. The momentary contact provided by the pressing of button 120 causes all pumps to operate simultaneously and also activates the alarm buzzer and lights. An emergency situation is thereby simulated.

Figure 5:
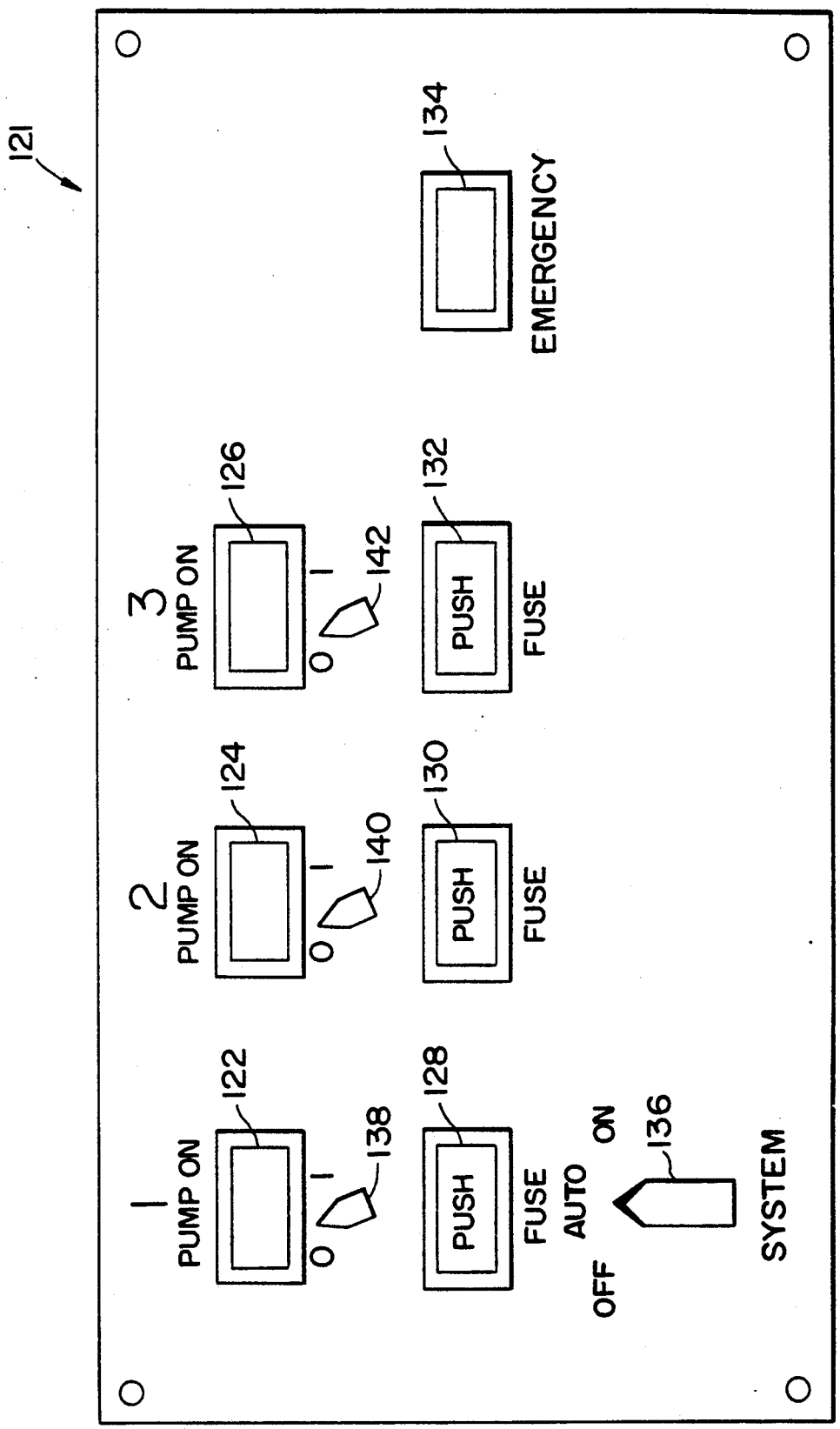
FIG. 5 depicts the control panel of a multi-pump system.

A control panel 121 for such a multi-pump system is depicted in FIG. 5. The lights 122, 124, and 126 (shown as 104, 106 and 108 in FIG. 4) simply indicate that a particular pump is in operation. The individual pump circuit breaker reset button/ indicator lights are depicted at 128, 130 and 132. Light 134 indicates an emergency situation has arisen. Switch 136 (shown as 97 in FIG. 4) allows the user to choose between three modes of operation in a manner similar to that of a single pump system. Individual switches 138, 140 and 142 (shown as 91, 93 and 95 of FIG. 4) allow the user to operate the pumps individually when the manual mode of operation has been chosen.

Figure 6:
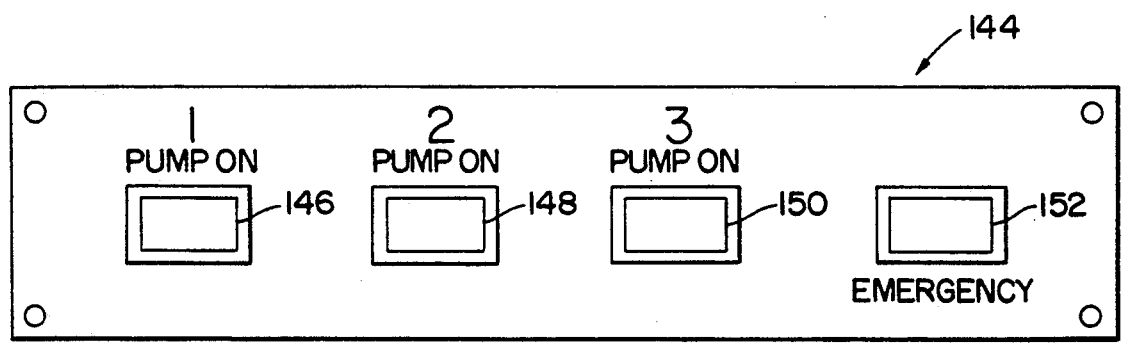
FIG. 6 depicts a remotely located indicator panel.

FIG. 6 shows a remotely located indicator panel 144 for a multi-pump system. The lights 146, 148 and 150 indicate that an individual pump is activated. Light 152 indicates an emergency situation exists.

Modification and variation can be made to the disclosed embodiments without departing from the subject and spirit of the invention as defined in the following claims. Such modifications and variations, as included within the scope of these claims, are meant to be considered part of the invention as described.

That which is claimed is:

1. A system for the automatic operation of a marine bilge pump comprising the serial combination of:
   a primary fluid level detector circuit for providing an output signal when a fluid level rises above a predetermined level;
   a primary fluid motion averaging circuit comprising the serial combination of an op-amp integrator for receiving and integrating said output signal, a low-pass filter section for receiving and filtering said integrated output signal, and an op-amp threshold trigger for receiving said integrated and filtered output signal and producing a pump activation signal when said integrated and filtered output signal exceeds a predetermined offset voltage;
   pump controller circuitry for receiving and amplifying said pump activation signal and activating at least one bilge pump therewith.

2. The system according to claim 1 further comprising a control panel, said control panel comprising a switch allowing the user to interrupt operation of the automatic system and further comprising a plurality of information lights.

3. The system according to claim 1 wherein said primary fluid level detector circuit comprises an integrated circuit in communication with a fluid level probe, said probe comprising a pair of conducting surfaces, said integrated circuit passing an alternating current between said surfaces when fluid is present therebetween, said integrated circuit further providing an output signal when said fluid is present between said surfaces.

4. The system according to claim 1 further comprising an emergency fluid level detector circuit similar to said primary fluid level detector circuit except adapted to sense fluid at a higher level thereof, and an emergency fluid motion averaging circuit similar to said primary fluid motion averaging circuit and in series with said emergency fluid level detector circuit for providing an emergency pump activation signal to said pump controller circuit.

5. The system according to claim 4 wherein said emergency fluid level detector circuit comprises an integrated circuit in communication with a fluid level probe, said probe comprising a pair of conducting surfaces, said integrated circuit passing an alternating current between said surfaces when a fluid is present therebetween, said integrated circuit further providing an output signal when said fluid is present between said surfaces.

6. A system for the automatic operation of a plurality of marine bilge pumps at a single location comprising individual pump operation systems provided in the same number as the number of pumps, said individual systems comprising, in series:
   a primary fluid level detector circuit for providing an output signal when a fluid level rises above a predetermined level;
   a primary fluid motion averaging circuit comprising the serial combination of an op-amp integrator for receiving and integrating said output signal, a low-pass filter section for receiving and filtering said integrated output signal, and an op-amp threshold trigger for receiving said integrated and filtered output signal and producing a pump activation signal when said integrated and filtered output signal exceeds a predetermined offset voltage;
   pump controller circuitry for receiving and amplifying said pump activation signal and activating at least one bilge pump therewith.

7. The system according to claim 6 wherein each said fluid level detector comprises an integrated circuit in communication with a fluid level probe, said probe comprising a pair of conducting surfaces, said integrated circuit passing an alternating current between said surfaces when fluid is present therebetween, said integrated circuit further providing said output signal when said fluid is present between said surfaces.

8. The system according to claim 6 further comprising a test switch to temporarily simulate the existence of the presence of fluid at an emergency level.

9. The system according to claim 8 further comprising an emergency fluid level detector circuit similar to said primary fluid level detector circuit except adapted to sense fluid at a higher level thereof, and an emergency fluid motion averaging circuit similar to said primary fluid motion averaging circuit and in series with said emergency fluid level detector circuit for simultaneously providing an emergency pump activation signal to all controller circuits.

10. The system according to claim 9 wherein said emergency fluid level detector comprises an integrated circuit in communication with a fluid level probe, said probe comprising a pair of conducting surfaces, said integrated circuit passing an alternating current between said surfaces when fluid is present therebetween, said integrated circuit further providing an emergency output signal when said fluid is present between said surfaces.

11. The system according to claim 6 further comprising a control panel, said control panel comprising a switch allowing the user to interrupt operation of the automatic system and further comprising a plurality of informational lights.

12. The system according to claim 11 further comprising at least one secondary control panel comprising a plurality of informational lights.

* * * * *